(12) United States Patent
Kopparapu et al.

(10) Patent No.: US 8,498,857 B2
(45) Date of Patent: Jul. 30, 2013

(54) SYSTEM AND METHOD FOR RAPID PROTOTYPING OF EXISTING SPEECH RECOGNITION SOLUTIONS IN DIFFERENT LANGUAGES

(75) Inventors: Sunil Kumar Kopparapu, Maharashtra (IN); Imran Ahmed Sheikh, Maharashtra (IN); Amol Sitaram Pharande, Thane (IN)

(73) Assignee: Tata Consultancy Services Limited, Maharashtra (IN)

( * ) Notice: Subject to any disclaimer, the term of this patent is extended or adjusted under 35 U.S.C. 154(b) by 407 days.

(21) Appl. No.: 12/782,326

(22) Filed: May 18, 2010

(65) Prior Publication Data
US 2010/0299133 A1    Nov. 25, 2010

(30) Foreign Application Priority Data
May 19, 2009  (IN) .......................... 1263/MUM/2009

(51) Int. Cl.
*G06F 17/28* (2006.01)
(52) U.S. Cl.
USPC ................ 704/2; 704/4; 704/7; 704/8; 704/9; 704/10

(58) Field of Classification Search
USPC ........................................................ 704/2–10
See application file for complete search history.

(56) References Cited

U.S. PATENT DOCUMENTS

| 7,406,417 | B1 | 7/2008 | Hain |
| 2004/0186732 | A1* | 9/2004 | Okura et al. .................. 704/277 |
| 2005/0197835 | A1 | 9/2005 | Reinhard et al. |
| 2007/0255567 | A1* | 11/2007 | Bangalore et al. ............ 704/260 |
| 2009/0006097 | A1* | 1/2009 | Etezadi et al. ................ 704/260 |
| 2009/0150153 | A1 | 6/2009 | Li et al. |
| 2009/0248394 | A1* | 10/2009 | Sarikaya et al. .................. 704/4 |

FOREIGN PATENT DOCUMENTS
WO    2009-150591 A1    12/2009

* cited by examiner

*Primary Examiner* — Leonard Saint Cyr
(74) *Attorney, Agent, or Firm* — Cowan, Liebowitz & Latman, P.C.; Mark Montague

(57) ABSTRACT

A system and method for porting of existing speech recognition solutions in a source language to a target language has been disclosed. The system envisaged by the present invention enables porting of a working speech recognition solution in the source language to a working system in the target language, thus minimizing the development process and reusing existing speech recognition solution components to recognize multiple languages.

5 Claims, 4 Drawing Sheets

- - - - - Flow for Source language

Process to include for conversion from Source to Target Language

SYSTEM AND METHOD FOR RAPID PROTOTYPING OF EXISTING SPEECH RECOGNITION SOLUTIONS IN DIFFERENT LANGUAGES

FIELD OF INVENTION

The present invention relates to the field of speech recognition.

DEFINITIONS OF TERMS USED IN THE SPECIFICATION

The following are definitions of terms known in the art and used in this specification:
Grapheme is the fundamental unit in a written language.
Phoneme is the smallest segmental unit of sound employed to form meaningful contrasts between utterances.
Translate is the comprehension of the meaning of a text and the subsequent production of an equivalent text that communicates the same message in another language.
Transliterate is the process of converting a text from one writing system into another in a systematic way.

BACKGROUND OF THE INVENTION AND PRIOR ART

Today, interactive technologies play a key role for improving customer service. Interactive technologies like IVR (Interactive Voice Response) accept verbal user input and/or request and provide pre-recorded or dynamically generated output in response to user's request.

Typically, IVR applications use speech recognition systems to recognize and convert either a spoken word or a sequence of spoken words to machine readable form for further processing and/or answering a user query. Typically, these speech recognition systems are deployed for a particular language, thus, when the same system has to be deployed for a different language, one has to port the existing system to enable it to understand the new language, which is equivalent to building a fresh application. Most of the existing systems are deployed in English due to:

(a) wider acceptability of the language; and
(b) the ready availability of information and other resources in English.

However, with increasing acceptability of speech based solutions in various countries, where the native language is other than English, there is an urgent need to convert existing speech recognition based applications in a source language, for instance English, to a target language for instance, Hindi.

Typically, an existing speech recognition based solution requires the following components:
a Speech Recognition (SR) engine with acoustic models for acoustic recognition;
a pronunciation lexicon of words which have to be recognized;
a speech grammar or language model; and
speech prompts which are used to evoke responses from users i.e. prompt users to submit their query.

The first three components work in tandem to convert the spoken speech to text, while the fourth component helps the existing speech recognition based solution to communicate with users. Typically, converting the existing speech recognition based solution from a source language to a target language needs these four components to be ported to the target language.

Although, acoustic models are tuned for a particular language, source acoustic models can be used to recognize speech in another language with decent accuracy if the other two components, namely, the pronunciation lexicon and the speech grammar are addressed adequately in the target language.

Essentially, converting the speech recognition based solution from one language to another necessitates creation of a new pronunciation lexicon for the target language that contains all words to be recognized by the speech recognition based solution and also a speech grammar model in the target language. Additionally, prompts in the source language have to be converted into prompts in the target language.

These modifications for porting the existing speech recognition based solution in the source language into the target language requires efforts equivalent to building an entirely new speech recognition based solution.

There have been various attempts in the prior art to develop systems which will enable the easy portability of applications from one language to another.

Particularly, U.S. Pat. No. 7,406,417 discloses a method for conditioning a database for automatic speech processing. The document discloses a neural network that can be trained for synthesizing or recognizing speech with the aid of a database produced by automatically matching graphemes and phonemes. First, graphemes and phonemes are matched for words which have the same number of graphemes and phonemes. Next, graphemes and phonemes are matched for words that have more graphemes than phonemes in a series of steps that combine graphemes with preceding phonemes. Then, graphemes and phonemes are matched for words that have fewer graphemes than phonemes. After each step, infrequent and unsuccessful matches made in the preceding step are erased. After this process is completed, the database can be used to train the neural network and graphemes, or letters of a text can be converted into the corresponding phonemes with the aid of a trained artificial neural network.

Further, United States Patent Application 2005197835 discloses method and apparatus for generating acoustic models for speaker independent speech recognition of foreign words uttered by non-native speakers. The document discloses acoustic models for speech recognition which are automatically generated and utilize trained acoustic models from a native language and a foreign language. A phoneme-to-phoneme mapping is utilized to enable the description of foreign language words with native language phonemes. The phoneme-to-phoneme mapping is used for training foreign language words, described by native language phonemes on foreign language speech material. A new phonetic lexicon is created containing foreign language words and native language words transcribed by native language phonemes. Robust native language acoustic models can be derived utilizing foreign language and native language training material. The mapping may be used for training a grapheme to phoneme transducer (i.e., foreign language to native language) to generate native language pronunciations for new foreign language words.

Furthermore, United States Patent Application 2009150153 discloses grapheme-to-phoneme conversion using acoustic data. The document discloses the use of acoustic data to improve grapheme-to-phoneme conversion for speech recognition, such as to more accurately recognize spoken names in a voice-dialing system. A joint model of acoustics and graphemes (acoustic data, phonemes sequences, grapheme sequences and an alignment between phoneme sequences and grapheme sequences) is described, as is retraining by maximum likelihood training and discriminative training in adapting grapheme model parameters using acoustic data. Also described is the unsupervised collection of grapheme labels for received acoustic data, thereby automatically obtaining a substantial number of actual samples that may be used in retraining. Speech input that does not meet a confidence threshold may be filtered out so as to not be used by the retrained model.

Additionally, World Intellectual Property Organisation document number 2009/150591 discloses a method and device for the generation of a topic-specific vocabulary and computer program product. The document discloses a method for the computer-aided generation of a topic-specific vocabulary from public text. The steps followed as disclosed in this document are: automatic selection of a language and topic-specific text; automatic generation of vocabulary entries each comprising a word together with a phonetic transcription on the basis of the selected text; automatic generation of the vocabulary entries is done employing a grapheme structure-based classification of the vocabulary entries, to classify the vocabulary entries according to a number of predetermined types; vocabulary entry type-specific grapheme-to-phoneme conversion; and to obtain phonetic transcriptions for words.

However, the aforementioned documents are not suitable for porting existing speech recognition solutions to plurality of target languages with minimum changes in the existing deployment. Therefore, there is a need for a system which will enable the existing applications to be quickly ported and/or modified to work in multiple target languages by reusing the speech recognition engine of the existing application.

OBJECT OF THE INVENTION

It is an object of the present invention to provide a system for enabling an existing speech recognition solution to be quickly ported to work in another target language.

It is another object of the present invention to provide a system for accurate source to target language lexicon and speech grammar transliterations and translations.

It is yet another object of the present invention to provide a system which automatically generates source language phonemic pronunciations of target language words.

SUMMARY OF THE INVENTION

A system for porting a speech recognition solution in a source language to recognize a target language, the speech recognition solution consisting of a speech recognition engine, a pronunciation lexicon in the source language, a speech grammar file for the source language, prompts in the source language, the system comprising:
lexicon conversion means adapted to convert the pronunciation lexicon of the source language to an equivalent lexicon to be used in the target language, the lexicon conversion means having:
  i. a first database for storing lexicon of words in the source language corresponding to analogous words in the target language;
  ii. translation means co-operating with the first database adapted to receive each word in the source language and provide its corresponding word in the target language;
  iii. transliteration means adapted to receive and map the translated word into source language graphemes;
  iv. grapheme to phoneme conversion means adapted to generate a source language phoneme sequence for each of the source language graphemes to obtain the phonetic pronunciation of the target language word in the source language;
  v. lookup table creation means adapted to receive a transliterated target language word in the source language and also receive equivalent phonetic pronunciation of the word from the grapheme to phoneme conversion means and prepare a lookup table;
grammar conversion means adapted to modify the speech grammar file of the source language to handle free speech based speech recognition solutions in the target language, the grammar conversion means having:
  i. translation means adapted to receive the speech grammar file of the source language and translate the grammar file to the target language;
  ii. transliteration means adapted to receive the translated grammar file and transliterate said translated grammar file to the source language and provide a transliterated grammar file for the target language in the source language;
prompt generation means adapted to convert voice prompts in the source language to the target language, the prompt generation means having:
  i. translation means adapted to convert words containable in the voice prompts of the source language into words in the target language;
  ii. identification means adapted to use the words in the lookup table of the lexicon conversion means to identify the phonetic pronunciation corresponding to the words containable in the prompts in the target language and provide a phoneme sequence of words containable in the prompts in the source language;
  iii. text to speech conversion means adapted to receive the phoneme sequence of words and generate a string of words containable in the prompts in the source language;
  iv. grammar adjustment means adapted to receive the converted string of words containable in the prompts in the source language and arrange the words in accordance with the transliterated grammar file for the target language and provide a grammatically modified text based prompt;
  v. speech generation means adapted to receive the grammatically modified text based prompt and generate speech based output for the grammatically modified text based prompt;
prompting means co-operating with said prompt generation means adapted to output the generated speech corresponding to a prompt in the target language to guide users to submit their query;
receiving means adapted to receive a speech based query from users in the target language, the query adapted to be received and converted into source language text and source language representation using the lookup table and the transliterated grammar file for the target language by the speech recognition engine;
processing means adapted to process said source language text and perform pre-determined operation and further adapted to provide a processed output;
compiling means co-operating with said lexicon conversion means, the speech grammar conversion means, the prompt generation means and the processing means and adapted to compile the final output in the target language; and
playback means adapted to play the final output in the target language.

In accordance with the present invention, there is provided a method for porting a speech recognition solution in a source language to work for target language, the method comprises the following steps:
- modifying a pronunciation lexicon of the source language to provide a pronunciation lexicon in the target language;
- modifying a speech grammar file of the source language to provide a speech grammar file in the target language;
- converting voice prompts in the source language to provide voice prompts in the target language;

The solution in target language then:
- prompts users to submit their query in target language;
- receives a speech based query from users in the target language;
- converts the received query into target language using the modified pronunciation lexicon of the target language;
- looks up the source language text equivalent to the identified target language text;
- processes the converted source language text based query to perform pre-determined operation and provide a processed output;
- compiles the final output in the target language; and
- plays the final output in the target language.

Typically, the step of modifying a pronunciation lexicon of the source language to provide a pronunciation lexicon in the target language includes the following steps:
- providing a first database for storing lexicon of words in the source language;
- translating each word in the source language and providing its corresponding word in the target language;
- transliterating each of the translated word into source language graphemes;
- generating a source language phoneme sequence for each of the source language graphemes to obtain the phonetic pronunciation of the target language word in the source language; and
- creating a lookup table of a word in the target language by mapping the transliterated word in the target language with its equivalent phonetic pronunciation.

Preferably, the step of modifying the speech grammar file of the source language to provide a speech grammar file in the target language includes the steps of translating speech grammar file of the source language to the target language and transliteration said translated speech grammar file from the target language to the source language.

Further, the step of converting voice prompts in the source language to the target language includes the following steps:
- translating the voice prompts of the source language into the target language;
    - identifying the phonetic pronunciation corresponding to the words containable in the prompts in the target language and providing a phoneme sequence of words containable in the prompts in the source language; and
- generating speech for said phoneme sequence of words and generating speech based output for said phoneme sequence of words prompt.

BRIEF DESCRIPTION OF THE ACCOMPANYING DRAWINGS

The invention will now be described with reference to the accompanying drawings, in which.

DETAILED DESCRIPTION

The conventional speech recognition solutions are typically built for a particular source language, typically English, however with increasing acceptability of speech based solutions in various countries, where the native language is different from the source language there is a need to quickly convert an existing speech solution working in the source language to a target language with minimum development efforts. In view to overcome these shortcomings of the existing speech recognition solutions, the present invention envisages building a speech recognition system in the target language from the existing speech recognition based solution in the source language.

Particularly, the system envisaged by the present invention enables porting of any existing speech recognition solution in the source language to the target language, thus minimising the time and effort involved in the development process and enabling reuse of existing speech recognition solution components.

Figure 1:
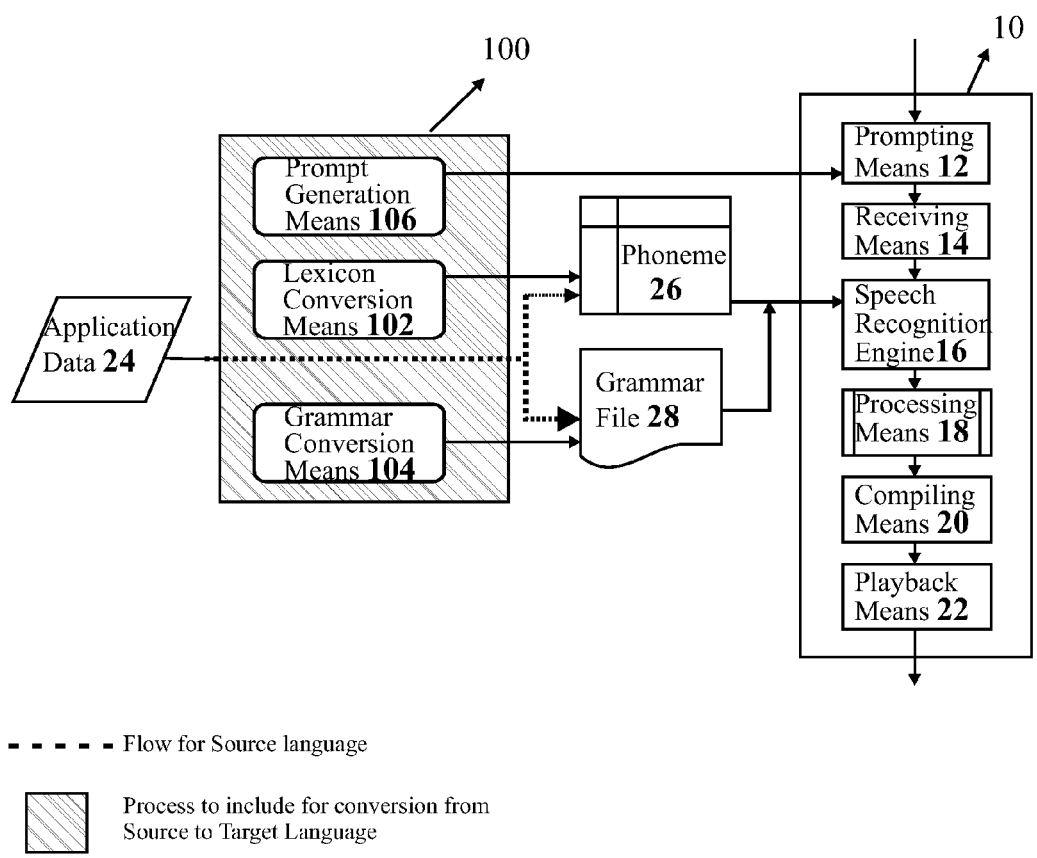
FIG. 1 illustrates the overview of the proposed system and its interface with an existing speech recognition solution in accordance with the present invention.

Referring to the accompanying drawings, FIG. 1 illustrates an overview of the present invention and its interface with an existing speech recognition solution in a source language for porting the existing speech recognition solution from the source language to a target language.

The conventional speech recognition applications are built of one or more call flow units, represented generally by reference numeral 10 of FIG. 1. Each of the conventional call flow units 10 include modules for performing the following functions:
- prompting users for speaking/submitting their request/query, performed by prompting means 12;
- receiving users request, performed by receiving means 14;
- recognizing users request, performed by a speech recognition engine 16;
- processing the recognized text to answer users request, performed by processing means 18;
- compiling results for providing to users, performed by compiling means 20; and
- providing response to users, performed by playback means 22.

Typically, the step of processing the recognized text involves processing of two types of data:
1. Speech (acoustic) data; and
2. Textual data.

The speech data is used at the point of interaction with users, while the textual data is processed internally for processing information extracted from the speech data.

To port such an existing speech recognition solution to the target language, the present invention proposes porting the existing solution by adopting the following steps:
- keeping the textual data, and its processing by the existing speech recognition call flow units unchanged;
- keeping the textual data representation (in source/English language) of the speech data unchanged, irrespective of the target language; and modifying the source speech recognition resources i.e. the phoneme lexicon and the speech grammar to process the target language.

In accordance with the present invention, referring to FIG. 1 the call flow units along with the application data 24 remains unchanged in the target language. The modification performed by the present invention is represented by block 100.

The present invention proposes to modify the phoneme lexicon, speech grammar and the voice prompts for porting any existing speech recognition solution to a target language efficiently.

The system 100 comprises the following components for porting the existing speech recognition solution from the source language to the target language:
  Lexicon Conversion Means 102 adapted to convert the pronunciation lexicon of the source language into an equivalent pronunciation lexicon in the target language;
  Grammar Conversion Means 104 adapted to convert the speech grammar file of the source language to handle free speech based speech recognition solutions in the target language; and
  Prompt Generation Means 106 adapted to convert voice prompts in the source language to the target language.

The aforementioned components of the present invention work in conjunction with the components of the existing speech recognition solution to port the existing solution to recognize a target language. The existing speech recognition solution components are as follows:
  application data 24 to provide the source speech recognition solution based data including the source language pronunciation lexicon, the speech grammar file and prompts;
  prompting means 12 adapted to guide users to submit their query;
  receiving means 14 adapted to receive a speech based query from users in the target language;
  speech recognition engine 16 of the existing speech recognition solution to receive the speech based query and convert it into source language phoneme using the lexicon modification means 102;
  processing means 18 adapted to process source language text and perform pre-determined operation and further adapted to provide a processed output;
  compiling means 20 adapted to compile a final output in the target language by compiling results from the lexicon modification means 102, the speech grammar modification means 104, the prompt generation means 12 and the processing means 18; and
  playback means 22 adapted to play the final compiled output.

Figure 2:
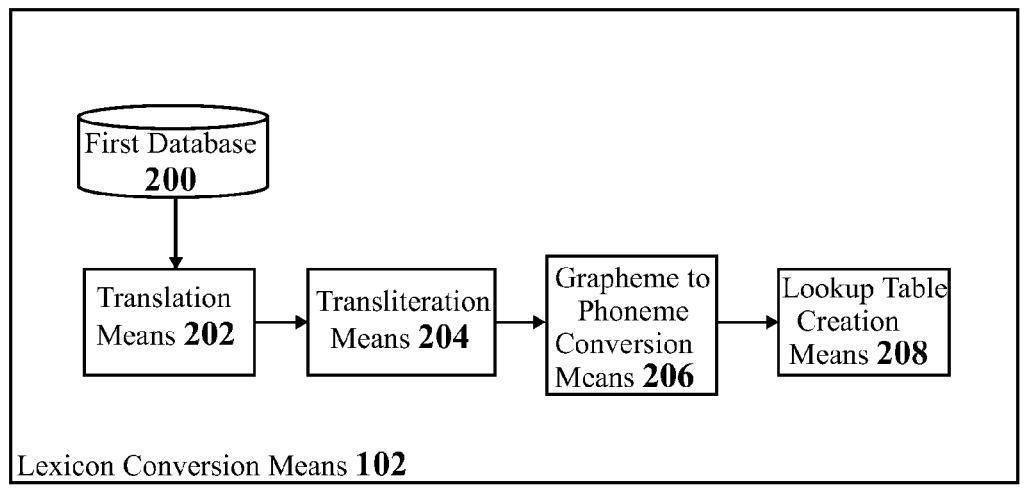
FIG. 2 illustrates the schematic of the Lexicon Conversion Means in accordance with the present invention.
Figure 3:
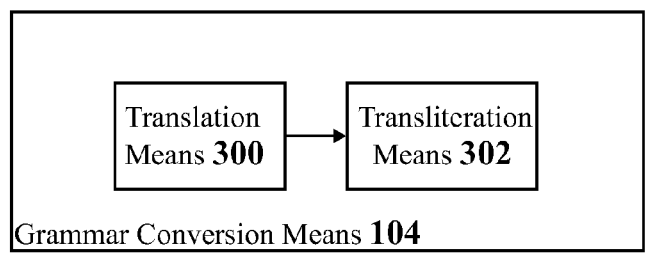
FIG. 3 depicts the schematic of the Grammar Conversion Means in accordance with the present invention.

FIG. 2 illustrates a schematic of the Lexicon Conversion Means 102 in accordance with the present invention.

The Lexicon Conversion Means 102 takes each word from the source language lexicon and determines its translation using the translation means 202. The translation means 202 checks if the word is present in the first database 200, if the word is present, the corresponding translated word in target language is taken from the first database 200. If the word is not present in the first database 200 then the word is transliterated into the target language graphemes using the transliteration means 204. The transliteration to the target language is performed based on the assumption that the word is a proper noun. Thus, the Lexicon Conversion Means 102 can handle both common nouns and proper nouns.

Further, the translated/transliterated word is transliterated into the source language graphemes by the transliteration means 204. The transliterated word in the source language is given to the grapheme to phoneme conversion means 206 which receives the transliterated word and generates a source language phoneme sequence to obtain the phonetic pronunciation of the target language word in the source language.

The porting of the source language lexicon to the target language will now be described with the help of the following example. For instance, if we have to port a word "gold" from the source language English to target language Hindi, this can be achieved by the following steps: firstly, the system envisaged by the present invention checks if an analogous word for "gold" is present in the first database 200, if yes then from the first database 200 the translated target language word सोना is selected by the translation means 202. Then a transliteration is done to convert the target language translated word सोना to "sona" by the transliteration means 204. Next, the pronunciation is determined from sona as "s/ow/n/aa" using the grapheme to phoneme conversion means 206 in the source language as seen in TABLE 1.

TABLE 1

|  | English | Hindi |
| --- | --- | --- |
| Grammar phrase | <Gold> | <Gold> |
| Lexicon entry | /g/ow/l/d/ | /s/ow/n/aa/ |
| Application asks for input | — | — |
| User speaks | /gold/ | /sonaa/ |
| Speech Recognition output and Process input | 'Gold' | 'Gold' |

To avoid the overhead of processing the target language word each time and obtaining its pronunciation in the source language, the Lexicon Conversion Means 102 prepares a lookup table using the lookup table creation means 208. The lookup table creation means 208 receives the transliterated target language word represented in the source language along with its phonetic pronunciation in the source language and creates a lookup table mapping the two.

Thus, next time the speech recognition solution needs to recognize a word in the target language, the step of grapheme to phoneme conversion can be skipped. The solution can directly obtain the phoneme sequence in the source language for any transliterated word which was a part of the pronunciation lexicon of the source language. This process speeds up the process of lexicon creation in the target language.

Referring to FIG. 1, the Lexicon Conversion Means 102 provides the lookup table to the 'Phoneme Lexicon' 26 which provides the target language word pronunciations to the speech recognition engine 16 of the call flow unit 10. The speech recognition engine 16 only understands/recognizes the source language hence by porting the source language words recognized by the speech recognition solution into words in the target language based on the script of the source language, the system can quickly and robustly recognize the target language words. In this way, the speech recognition engine 16 can be effectively reused with no development overhead thereby saving time for porting the existing speech recognition application to understand the target language.

Figure 4:
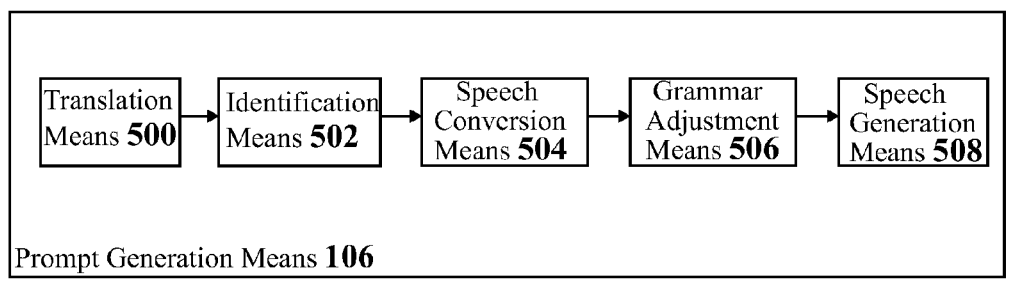
FIG. 4 depicts the schematic of the Prompt Generation Means in accordance with the present invention.

FIG. 4 illustrates a schematic of the Grammar Conversion Means 104 in accordance with the present invention.

In accordance with the present invention, the Grammar Conversion Means 104 is generally not required for an existing menu driven speech recognition solution because the solution expects only a word or a small sequence of words as input from users. Speech grammar modification (source-totarget) is required in cases where the speech recognition solution is expected to handle free speech user queries. The speech grammar creation for the target language is achieved by Grammar Conversion Means 104 by employing a translation means 300 which receives the speech grammar file of the source language and translates the grammar file to the target language. This translated file in the target language is transliterated to provide a transliterated grammar file for the target language in the source language by the transliteration means 302.

Referring to FIG. 1, the Grammar Conversion Means 104 performs these translations and transliterations and gives the output as the speech grammar file for the target language represented by block 28 to the speech recognition engine 16 of the call flow unit 10.

Figure 5:
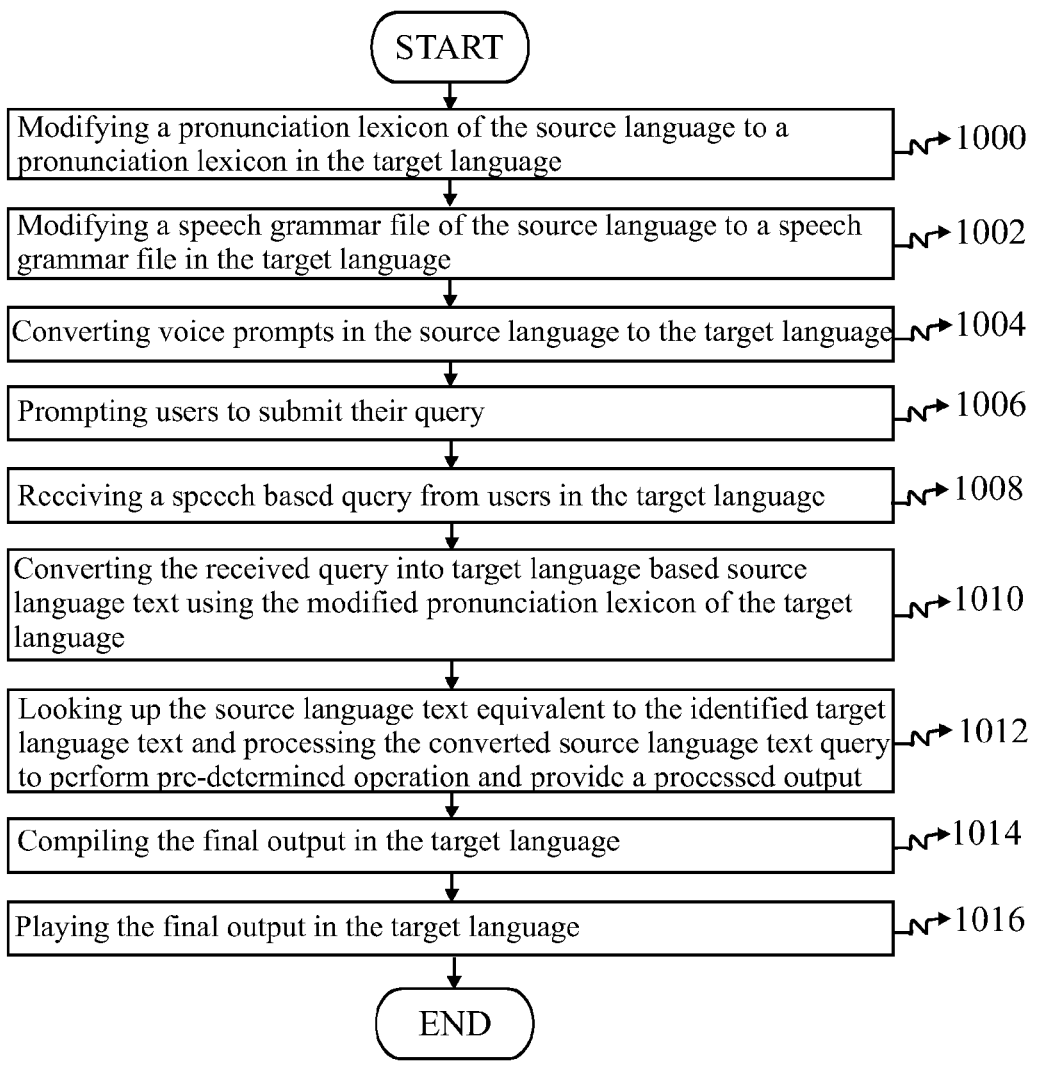
FIG. 5 illustrates the flow diagram showing a method for porting a speech recognition solution from a source language to a target language in accordance with the present invention.

FIG. 5 illustrates a schematic of the prompt generation means 106 in accordance with the present invention.

In accordance with the present invention, if recorded prompts are used in the existing solution, then a similar database of prompts in the target language is created and the existing speech recognition solution points to this database for prompts and responses to users, else the textual prompts in the source language are translated into the target language by translation means 500. The translated prompts are given to identification means 502 which uses the words in the lookup table of the lexicon conversion means 102 to identify the phonetic pronunciation corresponding to the words containable in the prompts in the target language and provides a phoneme sequence of words containable in the prompts in the source language. This phoneme sequence of words is aligned to form a string of words containable in the prompts in the source language by the text to speech conversion means 504. The aligned string is then passed on to the grammar adjustment means 506 which converts the string of words containable in the prompts in the source language and arranges the words in accordance with the transliterated grammar file for the target language and provide grammatically modified text based prompts which are converted to speech in real-time by the speech generation means 508.

Referring to FIG. 1, the prompting means 12 of the existing speech recognition solution co-operates with the prompt generation means 106 of the present invention to provide voice prompts to users in the target language. Users query in response to the prompt is received by the receiving means 14 and this query is recognized by the speech recognition engine 16 with the help of the Phoneme 26 and the grammar file 28. The recognized query is then processed as it was processed in the source language by the processing means 18. The final processed output to users is provided by the compiling means 20 and the playback means 22 provides the compiled output to the users typically in a voice based format. The playback means 22 can also be adapted to provide the compiled output in a text and/or multimedia format.

Thus, with the addition of the modifications proposed by the present invention a working speech recognition solution in the source language can be ported into a working speech recognition solution in the target language.

In accordance with the present invention, there is provided a method for porting a speech recognition solution in a source language to recognize a target language, the method comprises the following steps as shown in FIG. 6:

modifying a pronunciation lexicon of the source language to a pronunciation lexicon in the target language, 1000;
    modifying a speech grammar file of the source language to a speech grammar file in the target language, 1002;
    converting voice prompts in the source language to the target language, 1004;
    prompting users to submit their query, 1006;
    receiving a speech based query from users in the target language, 1008;
    converting the received query into target language based source language text using the modified pronunciation lexicon of the target language, 1010;
    looking up the source language text equivalent to the identified target language text and processing the converted source language text query to perform pre-determined operation and provide a processed output, 1012;
    compiling the final output in the target language, 1014; and
    playing said final output in the target language, 1016.

TECHNICAL ADVANCEMENTS

The technical advancements of the present invention include:

providing a system for building multilingual speech recognition systems;
    providing a system for enabling an existing application to be quickly ported to work in another language;
    providing a system which keeps the textual data, and its processing by the existing speech recognition call flow units unchanged and generates source language phonemic pronunciations of target language words;
    providing a system which minimizes the efforts equivalent to designing a new application in the target language when wanting to 'port' the existing application in a source language in target language; and
    providing a system which reuses the original application and business logic.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

We claim:

1. A system for porting a speech recognition solution in a source language to recognize a target language, said speech recognition solution consisting of a speech recognition engine, pronunciation lexicon in the source language, speech grammar file for the source language, prompts in the source language, said system comprising:

lexicon conversion means adapted to convert the pronunciation lexicon of the source language to an equivalent lexicon to be used in the target language, said lexicon conversion means having:
        i. a first database for storing lexicon of words in the source language corresponding to analogous words in the target language;
        ii. translation means co-operating with said first database adapted to receive each word in the source language and provide its corresponding word in the target language;
        iii. transliteration means adapted to receive and map said translated word into source language graphemes;
        iv. grapheme to phoneme conversion means adapted to generate a source language phoneme sequence for each of said source language graphemes to obtain the phonetic pronunciation of the target language word in the source language;

v. lookup table creation means adapted to receive a transliterated target language word in the source language and also receive equivalent phonetic pronunciation of said word from said grapheme to phoneme conversion means and prepare a lookup table;

grammar conversion means adapted to modify the speech grammar file of the source language to handle free speech based speech recognition solutions in the target language, said grammar conversion means having:
  i. translation means adapted to receive the speech grammar file of the source language and translate the grammar file to the target language;
  ii. transliteration means adapted to receive said translated grammar file and transliterate said translated grammar file to the source language and provide a transliterated grammar file for the target language in the source language;

prompt generation means adapted to convert voice prompts in the source language to the target language, said prompt generation means having:
  i. translation means adapted to convert words containable in the voice prompts of the source language into words in the target language;
  ii. identification means adapted to use the words in said lookup table of said lexicon conversion means to identify the phonetic pronunciation corresponding to the words containable in the prompts in the target language and provide a phoneme sequence of words containable in the prompts in the source language;
  iii. text to speech conversion means adapted to receive said phoneme sequence of words and generate a string of words containable in the prompts in the source language;
  iv. grammar adjustment means adapted to receive the converted string of words containable in the prompts in the source language and arrange the words in accordance with said transliterated grammar file for the target language and provide a grammatically modified text based prompt;
  v. speech generation means adapted to receive said grammatically modified text based prompt and generate speech based output for said grammatically modified text based prompt;

prompting means co-operating with said prompt generation means adapted to output said generated speech corresponding to a prompt in the target language to guide users to submit their query;

receiving means adapted to receive a speech based query from users in the target language, said query adapted to be received and converted into source language text and source language representation using said lookup table and said transliterated grammar file for the target language by the speech recognition engine;

processing means adapted to process said source language text and perform pre-determined operation and further adapted to provide a processed output;

compiling means co-operating with said lexicon conversion means, said speech grammar conversion means, said prompt generation means and said processing means and adapted to compile the final output in the target language; and playback means adapted to play said final output in the target language.

2. A method for porting a speech recognition solution in a source language to recognize a target language, said method comprising the following steps:

storing, in a first database, lexicon of words in the source language corresponding to analogous words in the target language;

receiving, each word in the source language and translating the received word into its equivalent word in the target language;

receiving and mapping translated word into source language graphemes;

generating a source language phoneme sequence for each of said source language graphemes and obtaining the phonetic pronunciation of the target language word in the source language;

receiving a transliterated target language word in the source language and receiving equivalent phonetic pronunciation of said word;

preparing a look up table wherein each of the transliterated target language words are mapped into equivalent phonetic pronunciation of said word;

generating the pronunciation lexicon of the source language to an equivalent lexicon to be used in the target language;

generating grammar for the target language speech; and generating speech based output corresponding to a voice prompt in the target language.

3. The method as claimed in claim 2, wherein the step of generating grammar for the target language speech, further includes the following steps:
  receiving a speech grammar file in a source language;
  translating the received grammar file into a target language; and
  receiving translated grammar file and transliterating the received grammar file to the source language and providing a transliterated grammar file for the target language, in the source language.

4. The method as claimed in claim 2, wherein the step of generating speech based output corresponding to a voice prompt in the target language, further includes the following steps:
  receiving a voice prompt in a source language;
  translating words contained in the received voice prompt of the source language into words in target language;
  identifying phonetic pronunciation corresponding to the words contained in the voice prompt, in the target language and providing a phoneme sequence of words containable in the voice prompt in the source language;
  receiving said phoneme sequence of words and generating a string of words containable in the voice prompt in the source language;
  receiving said string of words and arranging the words in accordance with a transliterated grammar file for the target language and providing a grammatically modified prompt text; and
  receiving said grammatically modified prompt text and generating speech based output for said grammatically modified text based prompt.

5. The method as claimed in claim 2, wherein the method further includes the following steps:
  outputting generated speech based output corresponding to a voice prompt in the target language to guide users to submit their query;
  receiving a speech based query from users in the target language and converting the received query into source language text and source language representation;
  processing said source language text and performing a pre-determined operation and providing a processed output; and compiling the processed output in the target language and
playing the processed output in the target language.

* * * * *